Figure 1:
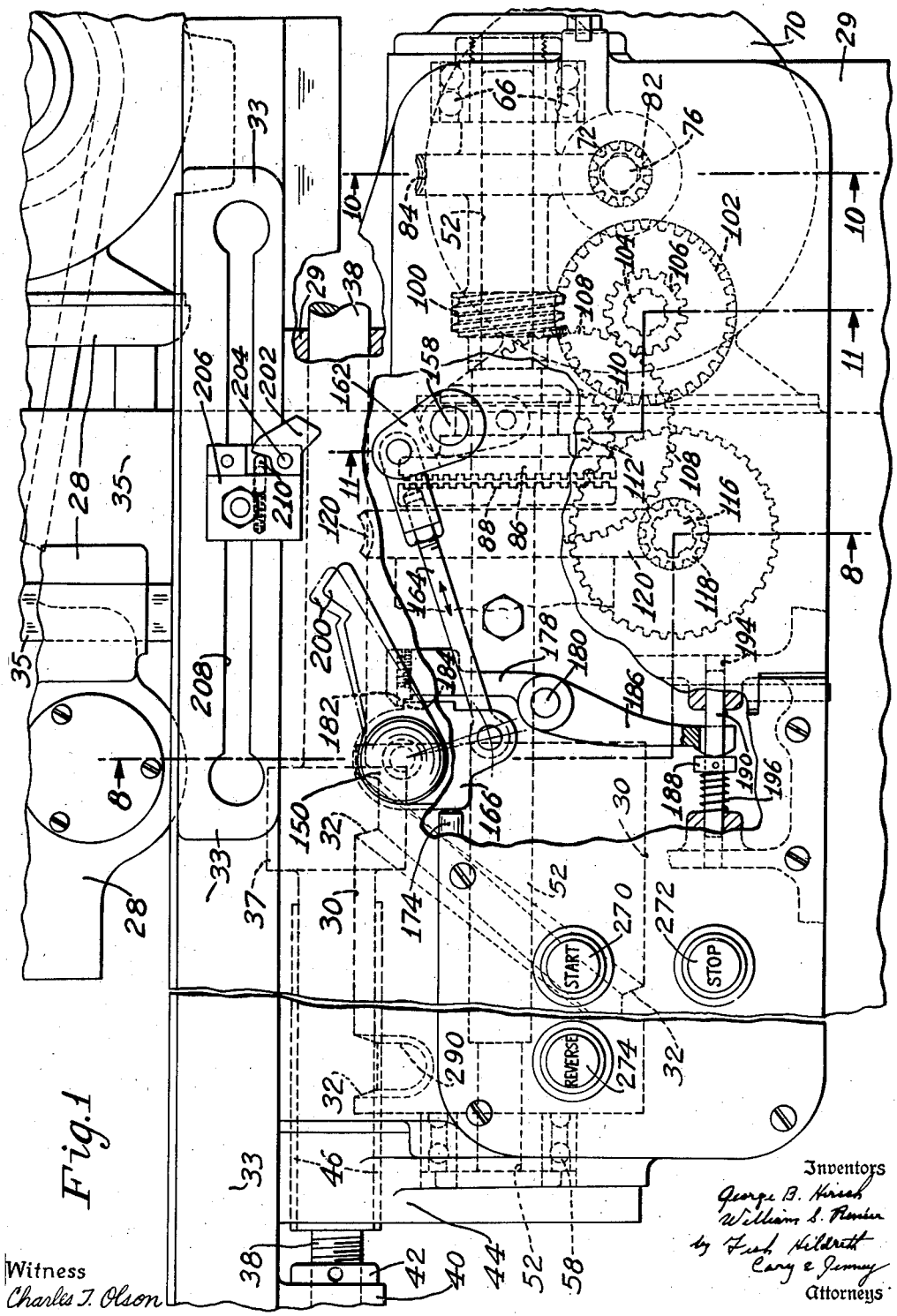

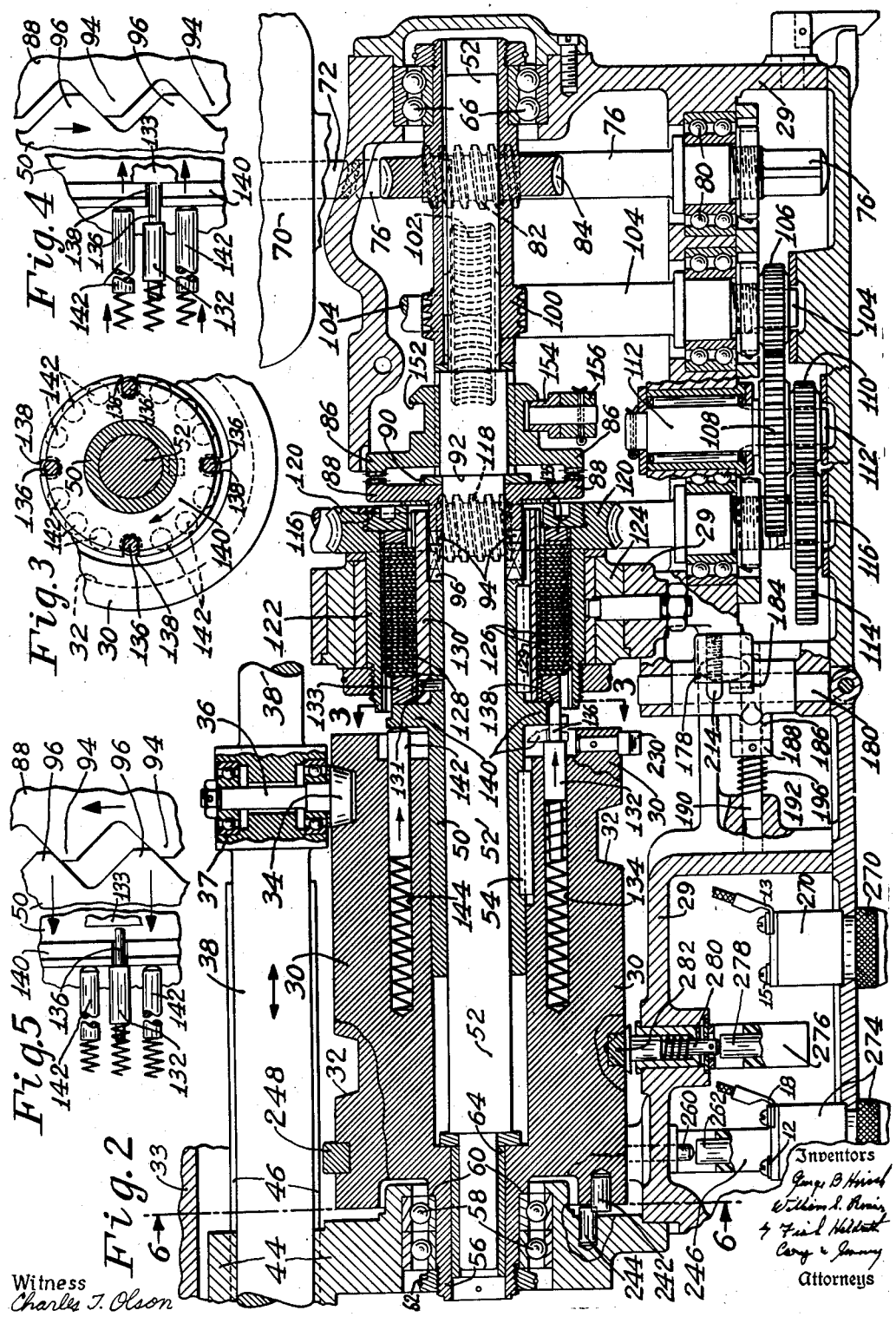

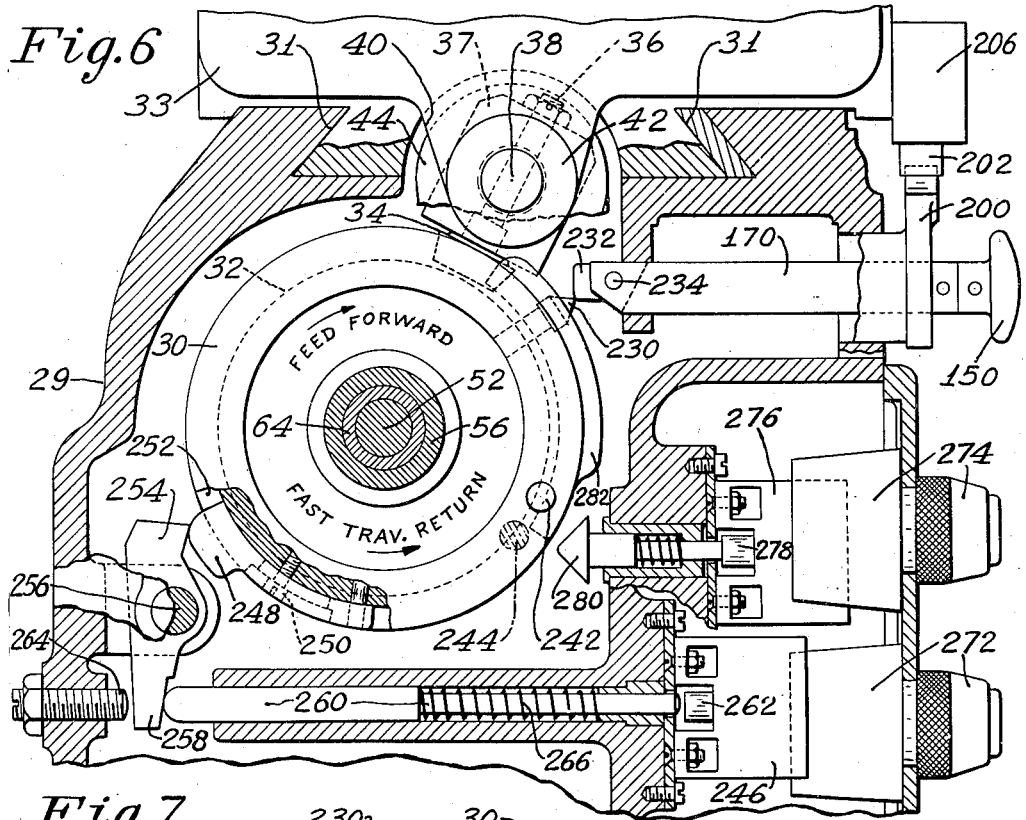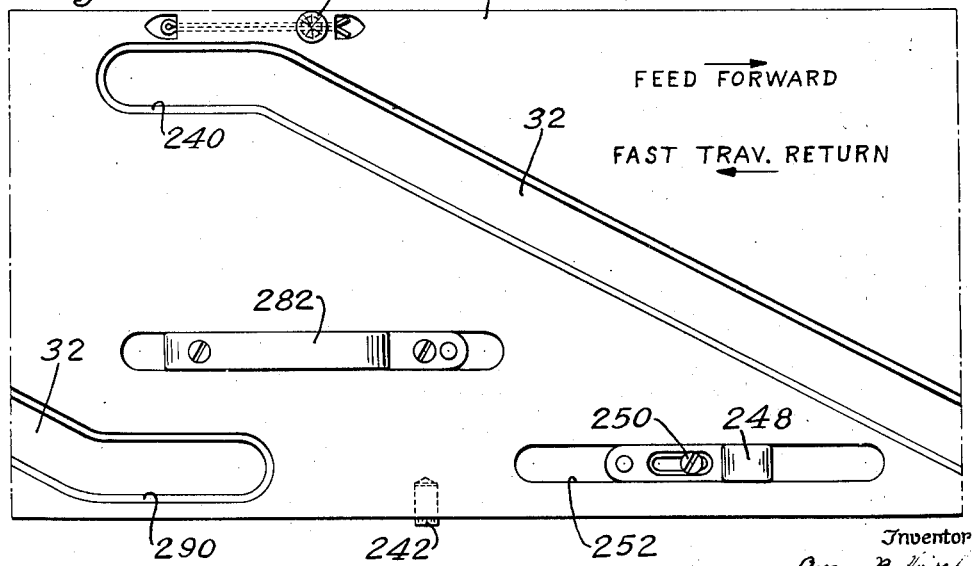

May 6, 1941.　　G. B. HIRSCH ET AL　　2,241,130
POWER DRIVING AND CONTROL MECHANISM
Filed May 13, 1939　　5 Sheets-Sheet 4
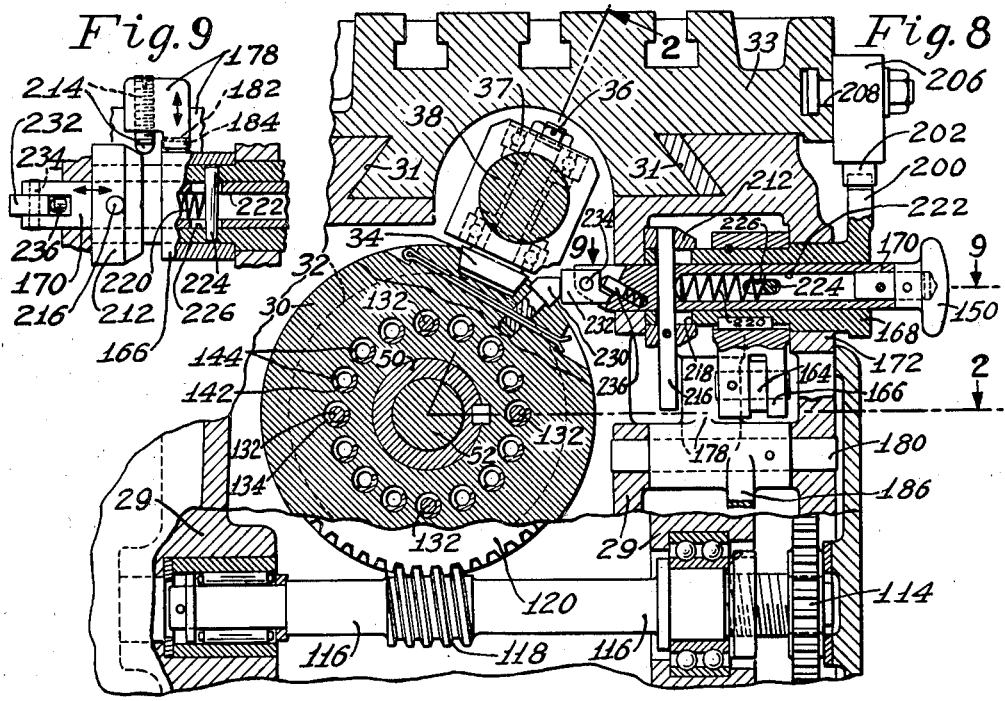
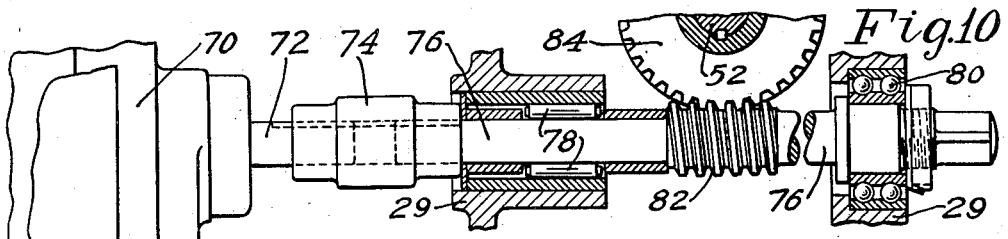
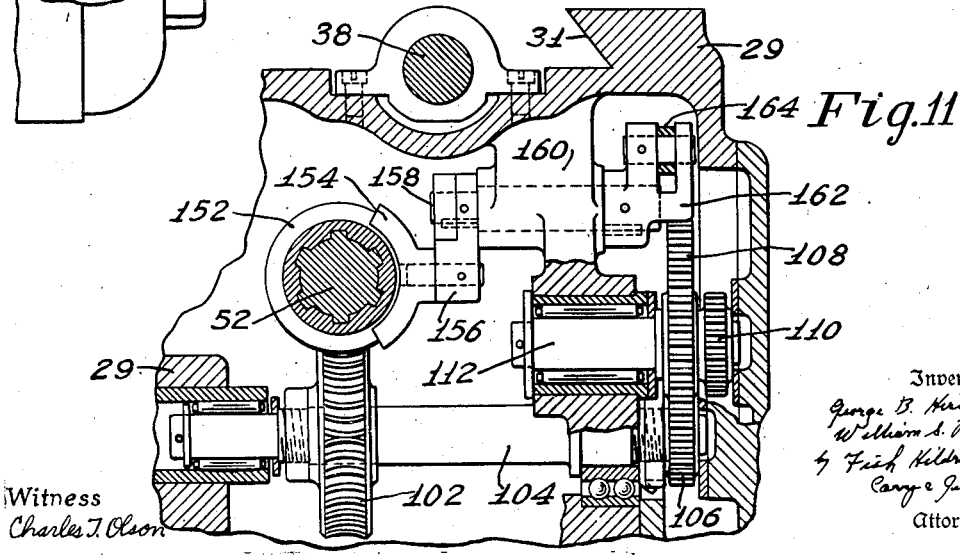
Witness
Charles J. Olson
Inventors
George B. Hirsch
William S. Pexior
by Fish Hildreth
Carey & Jennay
Attorneys

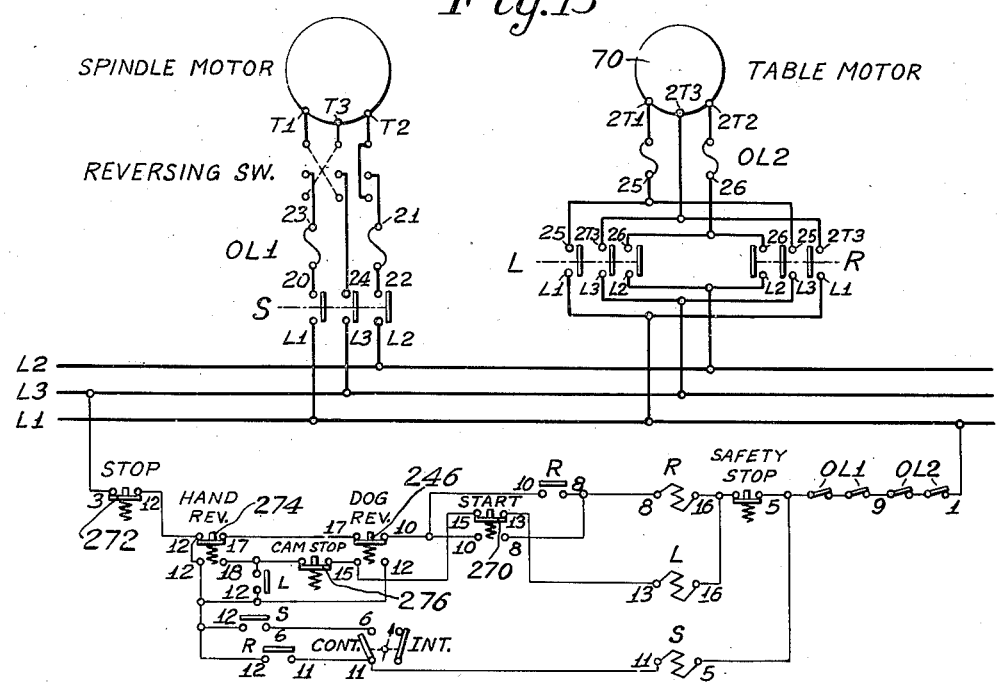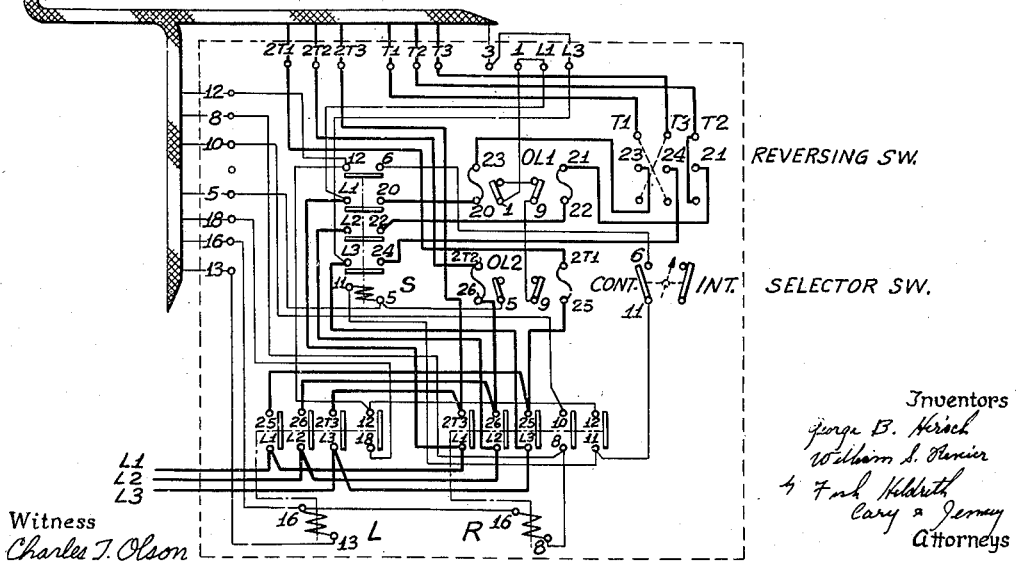

Patented May 6, 1941

2,241,130

UNITED STATES PATENT OFFICE 2,241,130

POWER DRIVING AND CONTROL MECHANISM

George B. Hirsch and William S. Renier, Providence, R. I., assignors to Brown and Sharpe Manufacturing Company, a corporation of Rhode Island Application May 13, 1939, Serial No. 273,496

19 Claims. (Cl. 192—145)

The present invention relates to improvements in power driving and control mechanisms for reciprocable machine tool supports.

The invention is herein disclosed in a preferred form as embodied in a cam actuated milling machine of the manufacturing type having a transversely movable work supporting table, and a rotary cutter spindle supported for vertical adjustment toward and away from the table. Reciprocation of the work supporting table is effected through connections which include a cylindrical driving cam, a follower connected to the table for engagement with a cam track formed in the periphery of the driving cam, a reversible electric motor, feed and quick traverse gear trains, and clutching means associated therewith automatically shiftable to cause the cam to be driven from the motor alternatively at a feed or traverse rate.

The table driving and control mechanism of the present application is in many respects similar to and is intended as an improvement upon that disclosed in the copending application of John E. Englund, Serial No. 186,575, filed January 24, 1938, for Power transmission mechanisms. As in the application above referred to, the work supporting table is arranged for operation in accordance with an automatic cycle which includes movement of the table from its start position at the fast or traverse rate, a continued movement in the same direction at a feed rate for the performance of a milling operation, and thereafter a return movement at the traverse rate to the initial start position.

It is a principal object of the present invention to provide a novel and improved power driving and control mechanism adapted for use in a machine of this general description, which will substantially retain the advantages of a simple and sturdy construction, and rapid operation inherent in a cam drive, and will at the same time permit of a more complete control of the power drive by the operator to move the table than has heretofore been considered possible in such machines.

It is a further object of the invention to provide a novel and improved power driving and control mechanism adapted for use in a machine of this general description, in which the reciprocation of the driven support is effected through a reversible electric motor and an actuating cam connected to be driven in reverse directions by the motor.

With this and other objects in view as may hereinafter appear, salient features of applicants' improved power driving and control mechanism consist in the provision of a reversible driving cam for the reciprocable support, and driving connections for the same including a reversible electric motor, and further in the particular construction and arrangement of said parts as hereinafter set forth, to provide for the rapid reciprocation of the driven support, an effortless and accurate stopping of the support at each end of its travel, and an easy reversal of the driving connections including the motor which will avoid excessive loading and consequent heating of the motor during continued operation of the machine.

Certain other features of the invention relate to the provision of a novel system of operating controls associated with applicants' improved drive mechanism which include a motor reversing switch automatically controlled from the driving cam to insure the reversal of the motor as the table reaches the end of its travel, and manually operable motor starting, stopping and reverse controls arranged to permit the stopping and starting of the table in either direction from any desired position.

The several features of the invention consist also in the constructions, combinations and arrangement of parts hereinafter described and claimed which together with the advantages obtained therefrom will be readily understood by one skilled in the art from the following description taken in connection with the accompanying drawings, in which Fig. 1 is a view in front elevation of a manufacturing type cam actuated milling machine, with a portion of the casing broken away, and certain of the underlying parts shown in section, to illustrate particularly the driving and controlling devices for the work supporting table; Fig. 2 is a developed sectional view illustrating particularly the driving and control mechanisms for the work supporting table, taken on the line 2—2 of Fig. 8; Fig. 3 is a detail sectional view taken on the line 3—3 of Fig. 2, illustrating particularly the flange for controlling the operation of the slow feed friction clutch; Fig. 4 is a developed view showing in detail the cam tooth clutch and the spring plungers cooperating therewith for controlling the engaging pressure on the slow feed friction clutch, the parts being shown in slow feed position; Fig. 5 is a view similar to Fig. 4, but showing a different position of the parts in which the cam has been positively stopped at the end of the travel in the direction of feed and the inertia of the driving connections including the reversible motor has caused the members of the cam tooth clutch to spread; Fig. 6 is a sectional view taken on the line of 6—6 of Fig. 2; Fig. 7 is a developed view of the cylindrical driving cam; Fig. 8 is a sectional view taken on the line 8—8 of Fig. 1, illustrating particularly the mechanisms for controlling the position of the high speed clutch; Fig. 9 is a detail view partly in section taken on the line 9—9 of Fig. 8; Fig. 10 is a detail sectional view taken on the line 10—10 of Fig. 1, and illustrating particularly certain of the driving connections from the table motor; Fig. 11 is a sectional view taken on the line 11—11 of Fig. 1, illustrating particularly the means for controlling the high speed clutch; Fig. 12 is a diagram of the electrical control circuits for the machine, and discloses particularly the electrical connections for controlling the operation of the table motor; and Fig. 13 is a simplified schematic diagram of the electrical connections shown in Fig. 12.

The driving mechanism for the reciprocable work table of a cam actuated milling machine illustrated in the drawings as embodying in a preferred form the several features of applicants' invention, comprises a cylindrical cam which is arranged as hereinafter more fully to be set forth, to be driven in reverse directions to effect the feeding and subsequent return movements of the reciprocatory work table. For effecting these translatory movements to the table, there is provided in the periphery of the cam for engagement with a follower on the table, a cam track which is particularly constructed and arranged to cooperate with the reversible driving connections to effect an easy stopping and reversal of the work table. The cam track is of constant pitch throughout the major portion of its length, and terminates at each end thereof in a dwell portion, so that during continued rotation of the cam, the table may be traversed at a uniform feed rate substantially to its limiting position in the direction of feed, and will then be brought to a stop prior to stopping and reversal of the cam. In accordance with the usual practice in cam actuated milling machines, the cam track is pitched at a high feed angle, that is, to produce a maximum linear movement of the support for a given angular movement of the cam. This construction and arrangement of the cam track including the dwell portions at each end thereof is of considerable importance to insure an easy stopping and reversal of the table while permitting an extremely abrupt stopping and quick reversal of the cam drive as hereinafter more fully set forth.

The cylindrical actuating cam is driven by means of a reversible electric motor, and connections which include slow speed and traverse transmission trains connected to be continuously driven thereby, a friction drag clutch operatively connecting the slow speed train to drive the table, a quick traverse clutch for connecting the traverse train to drive the table at the faster rate, and a rotatable and axially movable connecting sleeve member through which the drive to the table is taken through both the slow speed and traverse transmission trains. The traverse clutch is operatively connected to the connecting sleeve member by means of continuously meshed cooperating cam tooth clutch members formed respectively on the sleeve member and on the driven element of the traverse clutch, the construction and arrangement of the cam teeth being such that a driving impulse imparted through the traverse clutch connections tends to impart an axial as well as rotational movement to the connecting sleeve member. Axial movement of the sleeve connecting member is opposed in the first instance by a number of compression spring plungers which serve to build up a minimum resisting torque to the overdrive of the sleeve connecting member which is also operatively connected to the slow speed friction drag clutch. Continued axial movement of the sleeve connecting member resulting from further increase in the resisting torque through the cam tooth clutch connections causes this connecting member to engage with and act upon a second series of compression spring plungers through which the engaging pressure is maintained on the plates of the friction clutch to reduce the engaging pressure and consequent drag resistance provided by this clutch. The friction drag clutch and cam tooth clutch cooperate to maintain a total load resistance of substantially uniform value through the driving connections from the motor when the traverse clutch is engaged, which is available when the motor is disconnected in stopping from quick traverse operation to provide a braking resistance of uniform value to stop the table in its initial starting position. This construction and arrangement of the feed and traverse driving connections from the motor thus far described, is substantially similar to that set forth in the Englund application above referred to.

In carrying out the present invention, the driving connections above described, are employed in combination with the reversible electric motor and reversible cam of the illustrated construction to produce an effortless and accurate stopping of the work supporting table at the end of its feed stroke, and to produce an easy reversal of the driving connections including the motor, which will avoid excessive loading and consequent heating of the motor during continued operation of the machine under manufacturing conditions.

In accordance with a feature of the invention, the cylindrical feed cam is arranged to be driven against a positive stop at the end of its rotation in the direction of feed. Connections are also provided controlled by the angular position of the cylindrical cam for engaging the traverse clutch, and for reversing the motor just prior to the engagement of the cam with its stop. Under these conditions in which the rotation of the cylindrical feed cam is abruptly stopped, the inertia of the driving connections including the motor will produce a resisting torque in the cam tooth clutch connections tending to open this connection against the pressure of the compression spring plungers above referred to. During this phase of the operation, the cam tooth clutch connection therefore serves as a yieldable connection between the motor and the cam to mechanically brake the motor to a stop, and thereafter to assist in bringing the motor up to speed in the opposite direction.

Further in accordance with the present invention, an improved system of operating controls is provided including switch connections controlled by the cylindrical feed cam for reversing the motor, and manually operable starting, stopping and reverse switch connections which enable the operator to stop the table in any desired position, and to start the table from its stop position in either direction.

Referring specifically to the drawings, the machine is provided with a base 29 having formed thereon ways 31 on which is mounted a longitudinally reciprocable work table 33. A column support 35 formed as an integral unit with the base 29 carries a vertically adjustable spindle head 28 which may have mounted thereon a horizontally extending milling cutter spindle of ordinary description (not shown).

The mechanism for driving the work supporting table comprises a cam drum 30 having formed in the peripheral surface thereof a cam track 32 which receives a follower roll 34 connected to move with the work table 33. As best shown in Fig. 7, the cam track 32 is arranged to have a feed angle of constant pitch throughout its length, and terminates at each end thereof in a dwell portion. The cam drum 30 is arranged to be driven in reverse directions to cause the follower 34 to travel back and forth from one end of the track to the other to reciprocate the table. The follower 34 is supported on the lower end of a vertically extending pin 36 having a ball bearing support 37 in a longitudinally extending shaft 38 which is rigidly secured at the left hand end as shown in Figs. 1 and 2, to a depending bracket 40 by means of adjustable lock nuts 42 screw-threaded to the reduced end of the shaft 38. In order to maintain the shaft 38 and follower 34 in the proper angular position with relation to the driving cam drum 30, the shaft 38 is fitted to slide within a sleeve bracket 44 forming part of the base 29, and having a splined connection 46 with the shaft 38.

The cam drum 30 as best shown in Fig. 2 is carried on a connecting member 50 which takes the form of a sleeve loosely supported for rotational and axial movement upon a high speed drive shaft 52. A key 54 connects the drum 30 to turn with the sleeve 50 while permitting axial movement of the sleeve with relation thereto. At one end the cam drum 30 is further provided with a reduced end portion 56 which is externally supported by means of ball bearings 58 carried by the stationary bracket 44. The bearing 58 engaging between a shoulder 60 and a lock nut 62 on the reduced portion 56, serves also to support the drum 30 against axial movement on the base 29. The high speed drive shaft 52 is rotatably supported at one end by means of a bushing 64 within the reduced portion 56 of the drum 30, and at its other end by means of a bearing 66 carried on the base 29.

The cam drum 30 is connected to be driven from a reversible table motor 70 through driving connections which include a high speed driving train and a slow speed driving train. As best shown in Figs. 1, 2 and 10 of the drawings, the rotor shaft 72 of the motor 70 is connected through a coupling 74 to a cross shaft 76 which is supported in bearings 78 and 80 in the base 29, and has formed thereon a worm 82 meshing with a worm gear 84 on the high speed drive shaft 52. The shaft 52 may be connected to drive the cam drum 30 at the relatively faster rate through connections which include a high speed clutch member 86 keyed to turn with the shaft 52, and movable axially into engagement with a driven high speed clutch member 88 which is loosely sleeved to turn on the shaft 52, and supported against axial movement to the right as shown in Fig. 2, by means of a collar 90 supported against a shouldered portion 92 of the high speed shaft 52. The clutch member 88 is connected to drive the connecting sleeve member 50 by means of a continuously engaging clutch comprised by cam teeth 94 formed on the hub portion of the clutch member 88 which are arranged to be continuously meshed with corresponding cam teeth 96 formed on the adjacent end of the connecting sleeve member 50.

The cam drum 30 is alternatively driven at a relatively slow rate through a branch transmission which comprises a worm 100 on the high speed drive shaft 52 which meshes with a worm gear 102 on a cross shaft 104. The drive is taken from the shaft 104 through a gear 106 which meshes with one of two pick-off gears 108 and 110 carried by a stub shaft 122, the other of said gears meshing with a gear 114 on a cross shaft 116. A worm 118 mounted on the shaft 116 meshes with a slow speed worm wheel 120 which is mounted coaxially with the shaft 52 and connecting sleeve member 50, being rigidly secured to a multiple disk friction clutch sleeve member 122 which is externally supported in a bearing 124 in the base 29. The clutch sleeve 122 has splined to the inner periphery thereof, a number of friction clutch disks 126 arranged for engagement with cooperating disks 128 similarly splined to a cooperating friction clutch member 130 which takes the form of a sleeve rigidly secured to the connecting sleeve member 50 by means of a key 129 and locking pin 131. The disks 126 and 128 are supported to move freely in an axial direction with relation to the sleeves 122 and 130 to permit the engagement and slipping of the friction clutch. In order to prevent possible disengagement of the plates 126 and 128 from their respective splines due to the axial movement of the sleeve connecting member 50 and sleeve 130, the end plates of the friction clutch take the form of two relatively wide collars 133 and 135, the collar 133 being splined to the clutch sleeve 130, and the collar 135 at the opposite end of the series being splined to the sleeve 122.

The clutch disks 128 and cooperating disks 126 are normally forced to the right against the adjacent face of the worm gear 120 in clutching engagement with one another, as shown in Fig. 2, by means of four spring-pressed plungers 132 which are supported in axially extending bores 134 spaced 90° apart in the cam drum 30 for engagement with the collar 133. As best shown in Figs. 2 and 3, each of these spring-pressed plungers 132 is provided with a reduced portion 136 passing through a corresponding slot 138 formed in the periphery of a flange 140 on the sleeve connecting member 50, so that movement of the sleeve member 50 and flange 140 to the left from the position shown in Fig. 2, will operate by the engagement of the flange 140 with the shouldered end of the reduced portion 136 to reduce the frictional engaging pressure of the slow feed friction clutch. During slow speed operation of the table when the high speed clutch 86 is disengaged, the sleeve connecting member 50 is maintained in inoperative position to the right, in which the flange 140 is out of engagement with the shouldered portions of the plungers 132, and in which the cam teeth 94 and 96 are more nearly seated with relation to one another, as shown in Fig. 4, by the action of twelve spring plungers 142 seated in axially extending bores 144 formed in the cam drum 30 for continuous engagement with the flange 140 of the sleeve connecting member 50.

The shifting of the fast feed clutch member 86 into driving engagement with the driven clutch member 88 operatively connects the motor to the driving cam 30 through the traverse driving connections including the cam tooth clutch 94, 96, and imparts a positive overdriving impulse to the sleeve connecting member 50. The construction and arrangement of the driving connections is such that the slow feed friction clutch now acts to maintain a drag resistance through the driving connections which is automatically adjusted to compensate for variations in the load resistance through these connections, and serves to provide a braking resistance which is maintained automatically at a uniform value for stopping the table from quick traverse on its return to initial starting position. The operation of the driving connections to produce this effect is as follows:

The resistance to the overdrive of the connecting member 50 with relation to the feed worm wheel 120 acting through the slow feed friction clutch, causes the clutch teeth 96 to ride outwardly on the cammed surfaces of the teeth 94, shifting the connecting member 50 with the flange 140 to the left against the pressure of the spring plungers 142. This movement of the connecting member 50 continues until the flange 140 is brought into engagement with the shouldered portions of the spring plungers 132. A condition of equilibrium is now obtained in which the further increase of the load resistance through the cam tooth clutch connection 94, 96 will operate by increasing the force of the axial thrust of the sleeve member 50 to correspondingly reduce the engaging pressure exerted by the spring plungers 132 on the friction clutch plate members 126, 128, thus reducing the load resistance produced by the drag of the friction clutch members. Similarly, any reduction of the load resistance acting through the cam tooth clutch connection 94, 96 will operate by decreasing the force of the axial thrust of the sleeve member 50 to permit a corresponding increase of the frictional engaging pressure on the members of the friction clutch. It will readily be seen that the resistance acting through the cam tooth connection 94, 96 will be maintained at a substantially constant value until the parts have been brought to a full stop.

The operation of the high speed clutch 86 may be controlled automatically by movement of the table and associated parts, through the operation of an adjustable table dog and a trip member carried by the cam drum 30, or manually if so desired, through the operation of an axially movable manual control knob 150. As best shown in Figs. 1 and 9 of the drawings, the clutch member 86 has formed in the sleeve hub thereof, an annular groove 152 which is adapted to receive a shoe 154 carried on a clutch shifting lever 156 secured to a rock shaft 158 which is journalled in a bearing 160 in the base, and has secured to the opposite end thereof, an upwardly extending lever arm 162. The lever arm 162 is connected by a link 164 with a downwardly extending arm 166 keyed to a sleeve member 168 (see Figs. 8 and 9) which is supported upon an axially movable control pin or plunger 170, to the forward end of which is secured the manual control knob 150 above mentioned. The sleeve member 168 is externally supported to permit rotational movement thereof, in a bearing 172 in the machine frame. The sleeve member 168 and lever arm 166 are acted upon by means of a spring-pressed plunger 174 which is supported in a bracket 176 on the machine frame, and tends to turn the lever arm 166 in a counterclockwise direction as shown in Fig. 1, to move the high speed clutch 86 to its closed or high speed position. In order to maintain the clutch 86 in its slow speed position against the pressure of the spring-pressed plunger 174 when so desired, a latch mechanism is provided comprising a latch lever arm 178 pivotally supported intermediate its length on a pivot pin 180, and provided at its upper end with a latch 182 for engagement with a corresponding abutment 184 on the hub portion of the lever 166. The latch lever 178 is tensioned in a counterclockwise direction for engagement with the abutment 184 by means of connections which include a downwardly extending lever arm 186 rigidly secured to turn with the latch lever 178. The lever 186 at its lower end is engaged against a collar 188 secured to a spring-pressed plunger 190 which passes through the bifurcated lower end of the lever 186, and is supported at opposite ends in recesses 192 and 194 in the machine frame. A tension spring 196 coiled about the plunger 190 between the collar 188 and a portion of the machine frame, serves to tension the lever arm 186 and latch lever 178 in a counterclockwise direction as shown in Fig. 1.

For automatic operation of the clutch 86, two mechanisms are provided, one being employed to shift the clutch to its disengaged or slow feed position, and the other being employed to shift the clutch to its closed or high speed position. The first of these mechanisms comprises a dog actuated feed lever arm 200 which is rigidly secured to turn with the sleeve member 168 and clutch control lever 166, and is arranged to be acted on by a table dog 202 to move the clutch 86 to open position against the pressure of the spring plunger 174, and to permit the engagement of the latch 182. The dog 202 is carried on a pivot pin 204 on a supporting member 206 which is adjustably supported in a T-shaped slot 208 on the front side of the table 33. The dog 202 is so shaped as to be held rigidly in position when brought into engagement with the lever 200 during movement of the table 33 in the direction of feed, but is capable of being brushed aside during the movement of the table in a reverse or return direction. A light spring-pressed plunger 210 serves to maintain the dog 202 in operating position.

The second control mechanism for actuating the clutch 86 consists in a trip mechanism for releasing the latch 182, so that the clutch is permitted to move into its closed high speed position under the influence of the spring-pressed plunger 174. This trip mechanism consists of a beveled cam ring 212 which is slidably supported for movement lengthwise upon the sleeve 168, and is arranged to be brought into engagement with an adjustable trip pin 214 on the latch lever 178. The ring 212 is operatively connected with the rod 170 by means of a cross pin 216 which passes through a slotted portion 218 of the sleeve 168. The shaft 170 and cam ring 212 are normally maintained in a retracted inoperative position by means of a compression spring 220 which is supported in a central bore 222 in the shaft 170, and engages at its forward end against a cross pin 224 rigidly secured to the sleeve member 168 and extending through a slotted portion 226 of the shaft 170. The shaft 170 and cam ring 212 are moved outwardly to trip the latch 182, and thereby to shift the clutch 86 to its high speed position by means of a trip pin 230 which, as best shown in Figs. 2 and 8, is mounted on the peripheral surface of the cam drum 30, and is arranged to engage with a dog 232 pivotally supported by a pin 234 on the inner end of the shaft 170. The dog 232 is constructed and arranged to be maintained rigidly in position when acted upon by the trip pin 230 moving in a clockwise direction as shown, for example, in Fig. 8, but may be brushed aside if contacted by the trip pin 230 when moved in an opposite or counter-clockwise direction. A spring-pressed plunger 236 acts to maintain the dog 232 in operating position.

In accordance with the present invention, the feed and traverse clutch mechanism including the cooperating friction drag clutch and cam tooth traverse clutch connection above described have been adapted to cooperate in a most efficient manner with applicants' reversible driving cam and reversible electric motor to provide for a rapid and substantially continuous reciprocation of the work table in accordance with an automatic cycle. The operation of these connections in shifting from traverse to feed, from feed to traverse and in stopping from traverse operation at the end of the return stroke of the table to starting position has already been described.

Another feature of applicants' invention consists in the provision of a novel and advantageous construction and arrangement of the driving connections including applicants' reversibly driven actuating cam and reversible motor which is well adapted to provide for the rapid stopping and reversal of these connections at frequent intervals without shock and without any tendency toward excessive loading and heating of the motor. Under conditions of actual operation it is assumed that such reversals may take place as often as 20 or 30 times a minute.

In the preferred construction the feed cam track is formed at the right hand end thereof with a dwell portion 240 (see Fig. 7) which acts during continued rotation of the driving cam 30 to arrest movement of the table in direction of feed, and therefore acts to destroy the momentum of the relatively heavy moving parts including the table and work supported thereon. The cam 30 is then abruptly stopped from further rotation in the direction of feed by the engagement of a stop pin 242 on the left end of the cam 30 with a stop pin 244 fixedly mounted on the machine frame. Further in accordance with the invention, applicants provide means which act just prior to stopping of the cam to close the traverse clutch connections 86, 88 and to reverse the driving torque of the electric motor 70. The closing of the traverse clutch operates as previously described to connect the motor to the actuating cam 30 through the cam tooth connection 94, 96 which now acts as a yielding connection to cushion the stopping and reversal of the motor as the actuating cam 30 is brought to an abrupt stop by engagement with the positive stop as above described. This operation may be briefly described in connection with Figures 2 and 5 of the drawings. Rotation of the sleeve connecting member 50, and the driven element 96 of the cam tooth connection is abruptly and positively halted as the stop pin 242 on the cam 30 rides into engagement with the fixed stop 244. The motor 70 and driving connections therefrom including the driving element 94 of the cam tooth clutch will be brought more gradually to a stop as the driven element 96 is forced to the left against the pressure of the spring pressed plungers 132 and spring plungers 142, the position taken by the parts as the motor reaches a full stop position being substantially as shown in Fig. 5. The spring pressed plungers 132 and 142 then become effective to close the cam tooth connection forcing the driving element 96 of the cam tooth clutch connection to the right and acting through the engaging cam surfaces of this connection to impart a driving impulse to the motor 70 in the reverse or return direction. The effect is to substantially decrease the load on the motor imposed by the reversing torque during stopping and reversal.

The reversal of the motor at the end of the travel in the direction of feed is effected by means of a motor reversing switch 246 which is tripped into operation by means of a dog 248 adjustably supported by means of a clamping screw 250 in a slot 252 in the periphery of the actuating cam 30. The dog 248 is arranged to engage against a reversing lever 254, which is carried on a stationary pivot pin 256 and has formed thereon a downwardly projecting arm 258 for engagement at one end with a spring pressed plunger 260, which abuts at its other end against a switch actuating plunger 262. An adjustable stop screw 264 is arranged to limit the movement of the dog actuated lever 254 and spring pressed plunger 260 to the left in Fig. 6 under the influence of spring 266 acting on the plunger 260.

The operating controls for the table in addition to those above described include specifically a manual start switch 270, a manual stop switch 272, a manual reverse switch 274, and a cam actuated stop switch 276 for automatically stopping the table upon its return to the initial starting position. The manual stop, start and reversal switches are mounted on a control panel at the front of machine as best shown in Figs. 1 and 2 of the drawings. The cam actuated stop switch, see Figs. 2 and 6, comprises a switch plunger 278 and a spring pressed plunger 280 engaging therewith which is arranged to be acted upon a cam 282 adjustably supported in a slot formed in the periphery of the actuating cam 30 (see Fig. 7).

The electrical connections for controlling the operation of the table motor 70 and table 33 are fully illustrated and will be briefly described in connection with Figures 12 and 13 of the drawings.

With the table in its starting position to the left and with the electrical connections in the positions shown in Figures 13 and 14, pressing of the table start switch 270 closes contact 10—8 energizing relay coil R to close the R switch of the table motor 70 driving the table 33 to the right. Contactor R 10—8 closes forming an inter-lock to maintain R energized. Contactor R 12—11 also closes energizing relay coil S to start the spindle motor. Contactor S 12—6 closes forming an inter-lock for relay coil S. Inasmuch as the quick traverse clutch is assumed to be engaged when the machine is stopped, the table travels to the right at a traverse rate, and is then slowed to a feed rate by the operation of table dog 202, which acts on lever arm 200 to open the traverse clutch as previously described. Subsequently as the table reaches the limit of its movement to the right, the trip pin 230 on cam 30 acting against dog 232, shifts the traverse clutch to traverse position and the table reversing dog 248 engages with the dog actuating lever 254 to operate the motor reversing switch 246, opening the reversing switch contacts 17—10 and closing contacts 15—12. Coil R is de-energized and contactor R 10—8 drops out. The closing of the reversing switch contact 15—12 energizes relay coil L which acts to close the table motor L switch thus electrically reversing the table motor. Contact L 18—12 closes forming an inter-lock which maintains L energized as the reversing switch plunger 262 returns to its original position. Further rotation of the cam 30 is now stopped by engagement of the stop pins 242, 244, the cam tooth clutch connection 94, 96 acting as above described to mechanically stop the motor and to impart a driving impulse to the same in a reverse direction. As the table again approaches its starting position, the cam 282 on the periphery of the cam 30 is brought into engagement with the spring pressed plunger 280 to actuate the cam stop switch 276. The cam stop switch contact 18—15 opens, de-energizing relay coil L and allowing the table L switch to move to open position. The inter-locking contact L 18—12 drops out. Inasmuch as the table during its return movement to starting position is operating at quick traverse the de-energizing of the table motor 70 will cause the breaking torque imposed on the high speed drive by the compensating action of the cam tooth clutch connection 94, 96 and the slow speed friction clutch plates 126, 128 above described to become effective to stop the table accurately and dependably in the desired stop position.

In the illustrated construction, the electrical connections also include a manual reverse switch 274 which may be rendered operative to reverse the motor and to shift the direction of table travel from right to left, and thus to stop and to return the table to its initial starting position from any position during its travel in the direction of feed, that is, toward the right.

Assuming that the table is travelling to the right, relay coil R, being energized and inter-locking contactor R 10—8 closed, the pressing of the manual reversing switch opens contact 12—17, de-energizing coil R and causing the inter-locking contactor R 10—8 to drop out. At the same time the manual reverse switch contact 12—18 closes energizing coil L reversing the table motor. Contactor L 18—12 closes forming an inter-lock to maintain coil L energized. As the table now returns to its extreme position to the left the cam stop dog 282 will act as above described to open the cam stop switch 276 and will de-energize the table motor and cause the table to stop in its initial starting position.

In the event that the manual reversing switch 274 is actuated after the table dog 202 has acted on the lever 200, to slow the table to the feed rate, the table during its return movement will not be shifted to quick traverse as above described, but will be returned to its initial starting position at the feed rate, unless the operator manually shifts the traverse clutch into operation by pulling forwardly on the traverse clutch control knob 150. Assuming that the table is returned to its starting position at the feed rate, the braking effect produced by the inter-action of the feed and traverse connections is lost. Under these conditions, however, excessive over-run of the driving connections is prevented as follows:

When the table reaches its starting position the dwell portion 290 on the feed cam track 32 acts to check further movement of the table and the driving connections including the cam 30 and motor 70 are thereafter stopped by the engagement of the stop pin 242 with the opposite side of the stop pin 244, the motor 70 having been previously disconnected through the operation of the cam stop switch 276 as above described.

In the event that the operator has stopped the operation of the table at any intermediate point by pressing the table stop switch 272, it is possible to return the table directly to its starting position by pressing the hand reverse switch 274. The pressing of switch 274 closes switch contact 12—18 energizing table relay coil L to start the table moving toward the left. Inter-locking contactor L 18—12 closes to maintain L energized. The table is then automatically stopped in its initial starting position as above described.

It will be understood that the invention is not limited to the specific embodiment shown, and that various deviations may be made therefrom without departing from the spirit and scope of the appended claims.

What is claimed is:

1. A driving and control mechanism for a reciprocable machine tool support which comprises with a cam follower, a cylindrical cam arranged to be driven in reverse directions to impart feed and return reciprocatory movements to the support and having formed in the periphery thereof a single follower engaging feed and return cam track having a high feed angle, a reversible electric motor and speed reduction connections therefrom to drive the cam and means for controlling the operation of the support comprising means for starting, stopping and reversing the motor.

2. A driving and control mechanism for a reciprocable machine tool support which comprises with a cam follower, a cylindrical cam arranged to be driven in reverse directions to impart feed and return reciprocatory movements to the support and having formed in the periphery thereof a single follower engaging feed and return cam track having a high feed angle, a reversible electric motor and speed reduction connections therefrom to drive the cam, and means for controlling the operation of the support comprising a motor start switch connected to start the motor in the direction of feed, means for automatically reversing the motor at the limit of support movement in the direction of feed, and means for automatically disconnecting the motor upon the return of the support to starting position.

3. A driving and control mechanism for a reciprocable machine tool support movable in accordance with an automatic cycle including movement at a traverse rate, and thereafter at a feed rate in one direction, and a return movement to starting position at a traverse rate, which comprises with a cam follower, a rotatable cam arranged to be driven in reverse directions to reciprocate the support and having the follower engaging surface thereof cammed at a high feed angle, a feed transmission, a traverse transmission, a reversible electric motor connected to drive said transmission, feed-traverse clutching means shiftable to cause the cam to be driven from said transmission alternatively at a feed or a traverse rate, means for controlling the operation of the support in accordance with said cycle including a motor start switch connected to start the motor only in the direction of feed, means for automatically reversing the motor at the limit of support movement in the direction of feed, means for automatically disconnecting the motor upon return of the support to starting position, and means for automatically shifting said clutch.

4. A driving and control mechanism for a reciprocable machine tool support movable in accordance with an automatic cycle including movement at a traverse rate and thereafter at a feed rate in one direction and a return movement to starting position at a traverse rate, which comprises with a cam follower, a rotatable cam arranged to be driven in reverse directions to reciprocate the support, a feed transmission, a traverse transmission, a reversible electric motor connected to drive said transmissions, feed-traverse clutching means shiftable to cause the cam to be driven from said transmissions alternatively at a feed or a traverse rate, means for controlling the operation of the support in accordance with said cycle including a motor start switch connected to start the motor only in the direction of feed, means for automatically reversing the motor at the limit of support movement in the direction of feed, means for automatically disconnecting the motor upon return of the support to starting position, and means for automatically shifting said clutch, and a manually operable motor reversing switch operable only during movement of the support in direction of feed to reverse the motor.

5. A driving and control mechanism for a reciprocable machine tool support movable in accordance with an automatic cycle including movement at a traverse rate and thereafter at a feed rate in one direction and a return movement to starting position at a traverse rate, which comprises with a cam follower, a rotatable cam arranged to be driven in reverse directions to reciprocate the support, a feed transmission, a traverse transmission, a reversible electric motor connected to drive said transmission, feed-traverse clutching means shiftable to cause the cam to be driven from said transmissions alternatively at a feed or a traverse rate, means for controlling the operation of the support in accordance with said cycle including a motor start switch connected to start the motor in the direction of feed, a motor reversing switch controlled from the cam, a dog movable with the support and means controlled thereby to shift the traverse clutch to feed position, cam actuated means for shifting the clutch to the traverse position, and a manually operable motor reversing switch.

6. A driving and control mechanism for a reciprocable machine tool support which comprises with a cam follower, a rotatable cam arranged to be driven in reverse directions to impart feed and return reciprocatory movements to the support, a reversible electric motor and connections therefrom for driving the cam, and an electrical control system for the motor including a motor start switch connected to start the motor only in the direction of feed, a motor reversing switch and connections for actuating said reversing switch at the limit of support movement in the direction of feed, a motor stop switch and connections for actuating said switch on the return of the support to starting position, and a manually operable motor reverse switch connected to drive the motor only in the return direction.

7. A driving and control mechanism for a reciprocable machine tool support which comprises with a cam follower, a rotatable cam arranged to be driven in reverse directions to impart feed and return reciprocatory movements to the support, a reversible electric motor and connections therefrom for driving the cam, and an electrical control system for the motor including a motor start switch connected to start the motor only in the direction of feed, a motor reversing switch and connections for actuating said reversing switch at the limit of support movement in the direction of feed, a motor stop switch and connections for actuating said switch on the return of the support to starting position, a manually operable motor reverse switch connected to drive the motor only in the return direction, and a manually operable motor stop switch.

8. A driving and control mechanism for a reciprocable machine tool support which comprises with a cam follower, a cylindrical cam arranged to be driven in reverse directions to impart feed and return reciprocatory movements to the support and having formed in the periphery thereof a follower engaging cam track terminating in a dwell portion to limit support movement in the direction of feed, stop means for positively stopping rotation of the cam with the follower engaging said dwell portion of the cam track, and means for controlling the operation of the support including means for electrically reversing the motor and control means operative as the cam moves into engagement with the stop for reversing the motor.

9. A driving and control mechanism for a reciprocable machine tool support which comprises with a cam follower a cylindrical cam arranged to be driven in reverse directions to reciprocate the support, and having formed in the periphery thereof a follower engaging cam track having a high feed angle, a reversible electric motor and speed reduction connections therefrom to drive the cam, and means for controlling the operation of the motor, including a motor reversing switch, and means controlled by movement of the cam to a predetermined angular position for actuating said switch.

10. A driving and control mechanism for a reciprocable machine tool support which comprises with a cam follower a cylindrical cam arranged to be driven in reverse directions, to reciprocate the support and having formed in the periphery thereof a follower engaging cam track terminating at each end thereof in a dwell portion, a reversible electric motor connected to drive the cam, control means for the motor including means for starting, stopping and reversing the motor, and a stop means for the cam arranged to positively limit rotation of the cam in each direction for positions in which the follower has passed onto a dwell portion of the cam track.

11. A driving and control mechanism for a reciprocable machine tool support which comprises with a cam follower, a rotatable cam arranged to be driven in reverse directions to impart reciprocatory return and feed movements to the support and having the follower engaging surfaces thereof terminating at the limit of the feed stroke in a dwell portion, a reversible electric motor and connections therefrom including a yielding connection for driving the cam, a stop for positively limiting rotation of the cam in a limiting position in which the follower is engaged with said dwell portion, and control means for the support including means operable substantially as the cam moves into engagement with said stop to electrically reverse the motor whereby said yielding connection acting against said stop is rendered operative to assist in reversing the motor.

12. A driving and control mechanism for a reciprocable machine tool support which comprises with a cam follower, a cylindrical cam arranged to be driven in reverse directions to reciprocate the support and having formed in the periphery thereof a follower engaging cam track, a reversible electric motor, means including a yielding driving connection connecting the motor to drive the cam, stop means for positively limiting movement of the driving cam in each direction, and means for controlling the operation of the support including means rendered operative by movement of the cam substantially to one of said limiting positions for electrically reversing the motor, whereby said yielding connection acting against said stop means is rendered operative to assist in reversing the motor.

13. A driving and control mechanism for a reciprocable machine tool support which comprises with a cam follower, a cylindrical cam arranged to be driven in reverse directions to reciprocate the support and having formed in the periphery thereof a follower engaging cam track terminating at one end thereof in a dwell portion, a reversible electric motor and connections including a yielding driving connection connecting the motor to drive the cam, means for positively stopping rotation of the cam in said dwell position, and means for controlling the operation of the motor including means for electrically reversing the motor and means controlled by the cam for electrically reversing the motor as the cam moves into engagement with said stop, whereby the yielding connection acting against said stop, is rendered operative to assist in reversing the motor.

14. A driving and control mechanism for a reciprocatory machine tool support, which comprises with a cam follower, a rotatable cam arranged to be driven in reverse directions to reciprocate the support, a reversible electric motor, feed and transverse transmissions connecting the motor with the cam, feed-traverse clutching means, a yielding connection in said traverse transmission, stop means for positively stopping the cam at the end of its travel in one direction, means for electrically reversing the motor, and control means for the support including means operable during movement of the cam against said stop means to shift said clutching means to traverse position and to electrically reverse the motor whereby the yielding connection acting against said stop means is rendered operative to apply a reversing impulse to the motor.

15. A driving and control mechanism for a reciprocable machine tool support, which comprises a driven element arranged to be driven in reverse directions to impart feed and return reciprocatory movements to the support, a positive stop against which the driven element is stopped at the limit of its feed stroke, a slow speed transmission, a high speed transmission, a yielding connection in said high speed transmission, a reversible electric motor connected to drive both of said transmissions, means for electrically reversing the motor, clutching means shiftable to cause the driven element to be driven from said transmissions alternatively at high and slow speeds, and means for controlling the operation of the support including means operable during movement of the driven element against said stop to shift said clutching means to high speed position and to electrically reverse the motor whereby the yielding connection acting against said stop is rendered operative to apply a reversing impulse to the motor.

16. A driving and control mechanism for a reciprocable machine tool support which comprises a driven element arranged to be driven in reverse directions to impart feed and return reciprocatory movements to said support, a slow speed driving element, a high speed driving element, a reversible electric motor continuously connected to drive each of said elements, means for electrically reversing the motor, a friction clutch for operatively connecting the slow speed driving element with the driven element, pressure exerting means engaging said friction clutch, means for clutching the high speed driving element to drive the driven element, a driving connection between said clutching means and driven element including continuously meshed complementary relatively rotatable and axially displaceable cam tooth members, spring means acting to move said cam tooth members toward each other, means rendered operative by relative axial movements of said cam tooth members away from one another produced by relative rotational movement thereof to relieve the engaging pressure upon said friction clutch, stop means for positively limiting movement of the driven element in the direction of feed, and control means for the support including means rendered operative during movement of the driven element against said stop means to engage the high speed clutching means and to electrically reverse the motor.

17. A driving and control mechanism for a reciprocable machine tool support movable in accordance with an automatic cycle which includes movement at a traverse and thereafter at a feed rate in one direction, and a return movement to starting position at a traverse rate, which comprises with a cam follower, a cylindrical driving cam arranged to be driven in reverse directions to reciprocate the support and having formed in the periphery thereof a follower engaging cam track terminating at each end thereof in a dwell portion, a reversible electric motor, feed and traverse transmissions continuously connected to the motor, a friction clutch for operatively connecting the feed transmission to the cam, pressure exerting means for engaging said friction clutch, means for clutching the traverse transmission to the cam, a yielding connection intermediate the cam and each of said feed and traverse transmissions responsive to the overdriving impulse of said traverse transmission acting through said clutching means against the friction clutch to relieve the frictional engaging pressure of the friction clutch, stop means for positively stopping rotation of the cam with the follower engaging a dwell portion of the cam track, means for controlling the position of the traverse clutch, means for controlling the operation of the support including means for starting, stopping, and for electrically reversing the motor, and control means rendered operative substantially at the limit of movement of the cam in the direction of feed to engage the traverse clutch and to electrically reverse the motor whereby said yielding connection acting against said stop means is rendered operative to apply a reversing impulse to the motor.

18. A driving and control mechanism for a reciprocable machine tool support, which comprises a driven element arranged to be driven in reverse directions to impart feed and return reciprocatory movements to the support, a positive stop against which the driven element is stopped at the limit of its feed stroke, a main stem transmission, separate feed and traverse transmissions connected thereto, a yielding connection in said high speed connection, means for driving the main stem transmission in reverse directions to reciprocate the support, a feed-traverse clutching means shiftable to cause the driven element to be driven from said transmissions alternatively at a feed or traverse rate, and means for controlling operation of the support including means controlled from the driven element operable substantially as the driven element moves against said stop to shift said clutching means to traverse position and to reverse the direction of drive of the main stem transmission.

19. A driving and control mechanism for a reciprocable machine tool support which comprises a driven element arranged to be driven in reverse directions to impart feed and return reciprocatory movements to said support, a positive stop against which the driven element is stopped at the limit of its feed stroke, a slow speed driving element, a high speed driving element, a reversible prime mover and connections therefrom operative for simultaneously driving, reversing and stopping both of said driving elements, a friction clutch for operatively connecting the slow speed driving element with the driven member, pressure exerting means for engaging said friction clutch, means for clutching the high speed element with the driven member, and a yielding connection intermediate between the driven element and each of said slow and high speed driving elements responsive to the overdriving impulse of said high speed driving element acting through said clutching means against the friction clutch to relieve the frictional engaging pressure of the friction clutch, and control means for the support including means rendered operative during movement of the driven elements against said stop means to engage the high speed clutching means and to reverse said prime mover.

GEORGE B. HIRSCH.
WILLIAM S. RENIER.